United States Patent [19]

Lindberg et al.

[11] Patent Number: 4,840,802

[45] Date of Patent: Jun. 20, 1989

[54] PROCESS FOR BREWING BEER WHILE ENHANCING YEAST GROWTH

[75] Inventors: Chris E. Lindberg, Milwaukee; Edward J. Kot, Delafield; Etzer Chicoye, Milwaukee, all of Wis.

[73] Assignee: Miller Brewing Company, Milwaukee, Wis.

[21] Appl. No.: 795,629

[22] Filed: Nov. 6, 1985

[51] Int. Cl.$^4$ .............. C12C 11/04; C12C 3/00; C12N 1/38; C12N 1/18
[52] U.S. Cl. ..................... 426/16; 426/592; 426/600; 435/161; 435/244; 435/256
[58] Field of Search ............ 435/255, 256, 161, 244, 435/800; 426/11, 16, 592, 600

[56] References Cited

U.S. PATENT DOCUMENTS

| 3,164,472 | 1/1965 | Stone | 426/16 |
| 3,202,515 | 8/1965 | Stone | 426/600 |
| 4,315,038 | 2/1982 | Townsley et al. | 426/430 |

FOREIGN PATENT DOCUMENTS

| 0753555 | 12/1970 | Belgium | 426/600 |
| 2924175 | 12/1980 | Fed. Rep. of Germany | 426/16 |

OTHER PUBLICATIONS

Schisler et al., "Wort Trub Content and Its Effects on Fermentation and Beer Flavor", *ASBC Journal*, vol. 40, No. 2, (1981), pp. 57–61.
Schissler, D. O., J. J. Ruocco, and M. S. Mabee, 1982, Am. Soc. Brewing Chem., 40(2):57.
Jacobsen, T. and S. Lie. 1982, Brygmestern, 39 (6): 227.
Lie. S. and T. Jacobsen, 1983, Eur. Brew. Conv. Proc. Congr., p. 145.

*Primary Examiner*—Elizabeth C. Weimar
*Attorney, Agent, or Firm*—Quarles & Brady

[57] ABSTRACT

A process for enhancing yeast growth during the fermentation of beer which comprises adding to the wort ashed trub. The ashed trub is obtained by heating whole trub until all organic combustibles have been removed or destroyed. The ashed trub contains valuable trace elements, including zinc.

2 Claims, No Drawings

4,840,802

PROCESS FOR BREWING BEER WHILE ENHANCING YEAST GROWTH

Field of the Invention

The present invention relates generally to the brewing of beer. More particularly, it relates to an additive-free process of enhancing the growth of brewers' yeast during fermentation by adding to the wort a product containing yeast nutrients, including trace elements, which is obtained from a brewing product usually discarded.

BACKGROUND OF THE INVENTION

The effect of the presence of trace elements in wort has been recognized for many years. It is well known that various metals can affect the physical stability of beer. For example, excess copper, tin or iron in the wort can cause beer haze, gushing, off-flavors and discoloration of the finished product.

Present day market conditions demand long shelf lives for beer. Therefore, brewers have been concerned with controlling the factors that can alter the physical stability of the packaged product. One approach used by many brewers to insure physical stability has been to reduce the inorganic ion content of wort.

Market conditions also have led to the gradual abandonment of traditional brewing practices and the implementation of more efficient equipment and processes. The more effective removal of trub and the use of hop extracts in place of crude hops also has lead to a reduction of the amount of inorganic ions in the wort. As a result, worts now often contain a concentration of zinc and other metal ions which falls far short of the necessary minimum levels.

Recent studies have proven that zinc is an important element that enhances yeast growth, promotes vigorous fermentation and reduces flavor defects The requirements of yeast for adequate supplies of zinc and other trace elements are not surprising in view of the large number of enzymes involved in crucial metabolic pathways that require divalent cations as co-factors. For example, the yeast enzyme alcohol dehydrogenase, which converts acetaldehyde to ethanol, requires four atoms of zinc; two to hold the molecule together and the other two to confer activity to the enzyme. A zinc deficiency can lead to a loss in the activity of this enzyme and have severe repercussions on primary and secondary metabolic pathways.

For many years, yeast supplements were used in the brewing process as a primary source of zinc for yeast. Recently, however, because of the growing popularity of additive-free brewing, these sources of zinc have been eliminated from the production of many worts, There is a need for an additive-free process of supplementing the wort with zinc and the other desirable trace elements needed to enhance yeast growth, to insure vigorous fermentations and to reduce to a minimum flavor defects.

SUMMARY OF THE PRESENT INVENTION

It is an object of the present invention to disclose an additive-free process of supplementing wort with desirable trace elements to enhance yeast growth.

It is a further object to disclose a novel composition containing zinc and other desirable elements which is obtained from a product of the brewing process normally discarded by the brewer.

It is still a further object to disclose a method of preparing the aforementioned novel composition in a stable and convenient to use form.

The foregoing and other objects and advantages are obtained by the process of the present invention which comprises adding ashed trub to the wort prior to the fermentation of beer.

The process of adding ashed trub to wort is an effective means for supplementing wort with the trace elements, including zinc, which are essential for good yeast growth without altering the physical or sensorial properties of beer. Additionally, the addition of ashed trub enhances yeast growth, permits improvements in brewhouse efficiencies and wort clarities and reduces brewhouse effluents.

Whole trub is a complex material which contains significant quantities of lipids, free fatty acids and trace elements, including zinc, copper and iron. Ashed trub is prepared by heating whole trub to destroy the organic combustibles and to obtain a composition which contains all the non-combustibles and inorganic materials, including zinc and other metallic ions, which were present in the whole trub. The whole trub employed to prepare ashed trub may be from the same or a different brew than that to which the ashed trub is to be added.

Whole trub is formed when the wort is boiled to denature and subsequently coagulate proteins. As a result of the boiling, some of the proteins, along with similar nitrogenous compounds, interact with carbohydrates and/or polyphenolic compounds to form a precipitate that is commonly referred to as "trub" or "break".

Common practice among brewers has been to remove as much whole trub as possible from wort prior to fermentation. Whole trub is removed from wort for a variety of reasons that include cleaner yeast for reclaiming, better beer filterability and reduced wort cooler maintenance. There also is evidence that whole trub in wort can lead to loss of physical stability, an increased harsh, grainy bitterness in beer and reduced foam head retention. Researchers have also suggested that the oxidation products of the linoleic acid found in whole trub are potential precursors of trans-2-nonenal—an important component of the "cardboard" or "paper" flavor of stale beer.

Schisler et al. (1) characterized whole trub and its relationship to yeast activity during fermentation and found that increased levels of whole trub in wort resulted in faster rates of fermentation, decreased levels of esters and sulfury aromas, and higher concentrations of fusel oils in the finished product. They concluded that the enhanced rate of fermentation was due primarily to linoleic acid and other unsaturated fatty acids found in whole trub and, perhaps, to the zinc that is bound to the whole trub. They also indicated that fatty acids were probably responsible for the reduction in ester synthesis by the yeast during fermentation. Other researchers have observed similar results and have proposed that unsaturated fatty acids induce triglyceride synthesis in yeast, which, in turn depletes the pool of acetyl CoA, thus making it unavailable for ester synthesis. Schisler et al. supra were unable to explain why increased levels of whole trub solids increased the production of fusel oils by yeast. However, it appears that the unsaturated fatty acids and zinc found in whole trub were primarily responsible simply by their ability to enhance fermentation rate and yeast growth. Ample evidence can be found that correlates enhanced yeast growth with greater fusel oil production. Schisler et al. concluded that whole trub influences yeast growth and fermentation rate, and can alter the yeast's requirement for oxygen.

However, the disadvantages and risks of using whole trub in such a process are many-fold and deserve serious attention. Most importantly, whole trub fatty acids and lipids can severely impair beer flavor, aroma and physical stability. Furthermore, consistent addition rates of whole trub to wort may be difficult to obtain because many variables influence the quality, quantity and character of hot break trub. If whole trub cannot be added to wort in a consistent fashion, greater variation in the sensorial and physical properties of end-fermented worts and resulting beer may occur.

The value of adding whole trub to wort to add metallic ions is questionable because no clear evidence exists that the zinc and other metallic ions associated with whole trub are available to yeast. Indeed, the strong binding capacities of insoluble organic materials, such as those in whole trub, for ions probably makes such ions unavailable for yeast growth (2). This is particularly true for zinc, copper and magnesium because of their high equilibrium constants with ligands (2).

Other disadvantages of increasing whole trub levels in wort include decreased wort filterability, difficulties in reclaiming clean yeast from fermenters, and the clogging of plate exchanger wort coolers. It has been proposed to add zinc salts to wort but the use of such additives conflicts with the desire for additive-free brewing (3).

The process of the present invention which comprises adding ashed trub to wort has numerous advantages over the use of whole trub that include:

1. The ashed trub is simpler to handle than whole trub. Therefore, the addition rate to wort can easily be controlled to make the process quantitative.

2. The composition of ashed trub can be standardized. As a result, variations in flavor and aroma characteristics of the finished product can be minimized.

3. The use of ashed trub permits more complete separation of the whole trub from the wort which increases brewhouse efficiency through increased wort recoveries. The total removal of the whole trub from the wort increases wort clarity, increases product stability and probably enhances foam head retention.

4. More complete removal of whole trub from wort greatly reduces the potential for the residual organic materials in whole trub in the wort to act as a non-available sink for ionic species. Therefore, if all whole trub is removed only minimal amounts of ashed trub are required to elevate the concentrations of zinc and other elements to their proper concentrations.

5. The use of ashed trub eliminates the negative flavors and aromas caused by the organic constituants of whole trub because ashing completely removes all organic compounds.

6. Ashed trub is microbiologically stable.

7. The more complete removal of whole trub and the use of ashed trub results in the reclaimed yeast being cleaner because it contains less whole trub.

8. The use of ashed trub results in reduced maintenance costs of equipment susceptible to damage by whole trub, e.g. plate exchanger wort coolers.

9. The use of ashed trub results in reduced brewery effluents.

A detailed description of the invention is included in the experimental work described below.

The effects of added zinc on the rate of fermentation of commercial beer worts, the organic volatiles present in end-fermented worts, and on the flavor characteristics of the packaged product were studied. In these studies, zinc was added to the fermentations in the form of Yeastex-61, zinc sulphate and ashed trub.

MATERIALS AND METHODS

Trub Preparation. Trub from commercial beer brews was collected from the bottom of hot wort settling tanks after 80% of the wort had been transferred to the fermentation cellars. The trub was reduced to a wet paste by centrifugation at $4,000 \times g$ for 10 minutes for purposes of quantification.

Measured portions of the trub paste were placed in Waring blenders, mixed with small volumes of wort and homogenized for ten minutes at high speed. Laboratory scale fermentations (1 liter) and pilot scale fermentations (32 liter) were brought to volume with the homogenized trub at rates of addition of 32 g wet paste/l and 10 g wet paste/l, respectively.

Ashed Trub Preparation. Whole trub in the form of paste was dried at 95° C. for 4 hours in a forced air oven. The dried trub was heated in porcelain crucibles with a bunsen burner until smoke ceased to evolve from the material. Finally, the porcelain crucibles containing the burned trub were placed in a muffle furnace and heated for 4–8 hours at 500° C. to remove all combustibles. The resulting product was ashed trub.

Preparation of Fermentation Supplements. Yeastex-61 and zinc sulphate were slurried first in wort prior to their addition to the fermentation vessels. Ashed trub was first dissolved in a minimal volume of wort whose pH was maintained at 5.0 by the dropwise addition of concentrated phosphoric acid. All supplements were added to wort prior to pitching and the quantities used calculated to increase zinc concentrations in wort by 0.2 mg/l.

Fermentations. One liter laboratory fermentations were prepared by aerating wort collected from the cold side of the hot wort coolers and pitched with brink yeast at a rate of $10 \times 10^6$ cells/ml. The fermentations were incubated at 15° C. for nine days. Samples were removed from each fermentation on a regular basis for analysis.

Pilot-scale fermentations (32 liter) were prepared, finished and packaged for sensory analysis.

Specific Gravity Determinations. Fermenting wort samples to be analyzed by specific gravity were clarified by filtration through 0.45 μm pore-size membrane filters and degassed by sonication for three minutes. Specific gravities were measured using a Mettler/PAAR densitometer.

Headspace Volatiles Analysis. Fermenting wort samples were clarified by filtration through 0.45 μm pore-size membrane filters at the time of collection and frozen for later analysis. Concentrations of a variety of volatile organic compounds were measured using headspace gas chromatography.

Sensory Analysis. Beers produced from pilot-scale fermentations were organoleptically analyzed by a taste test panel using the duo-trio method.

Zinc and Copper Determinations. Zinc and copper in worts, fermenting worts and beers were measured directly using atomic absorption spectroscopy. The zinc content of ashed trub was determined by dissolving a measured amount of the ashed trub in concentrated HCl, diluting the solution with distilled water and measuring the zinc directly using atomic absorption spectroscopy.

RESULTS

Rates of Fermentation. The specific gravities of fermenting worts supplemented with Yeastex-61, zinc sulphate, homogenized trub, and ashed trub were reduced or compared to a control. The laboratory fermentation containing homogenized trub was rapidly attenuated by the yeast; after 88 hours of fermentation, the specific gravity of the fermenting wort had reached a minimum. In contrast, the control fermentation did not attain a minimum specific gravity until 128 hours had elapsed. The remaining four fermentations were comparable to each other, having reached a minimum specific gravity after 104 hours of fermentation. While these fermentations were not attenuated as rapidly as the fermentation containing whole trub, they were significantly faster than the control fermentation which required another 24 hours before attaining a minimum specific gravity. It should be noted that based on zinc content, the homogenized trub was added at three times the rate used for the other additives.

Effect of Zinc Containing Supplements on Vicinal Diketones. Fermentations that contained added zinc in the form of Yeastex-61, zinc sulphate, homogenized trub or ashed trub had significantly lower concentrations of vicinal diketones (VDK) than the control fermentation after 73 hours and 187 hours of fermentation. The most striking differences were observed between the control fermentation and the fermentations containing Yeastex-61, homogenized trub and ashed trub. After 187 hours of fermentation, the control fermentation had 0.077 mg VDK/l and the fermentations containing Yeastex-61, homogenized trub and ashed trub (added to wort) had 0.038 mg VDK/l, 0.036 mg VDK/l and 0.036 mg VDK/l, respectively. The two fermentations containing zinc sulphate and ashed trub added to the pitching yeast had VDK concentrations of 0.045 mg/l and 0.041 mg/l, respectively.

Effect of Rates of Addition of Ashed Trub on Fermentation. Fermentations containing different concentrations of ashed trub (added to wort prior to pitching) were monitored for wort attenuation. In general, increasing the amount of ashed trub in wort increased the rate of attenuation. The greatest differences were observed between the control fermentations with no trub and the fermentations to which ashed trub had been added. While increasing the amount of ashed trub to wort increased the rates of attenuation, the differences among the five fermentations containing different amounts of ashed trub were relatively slight.

Effect of Rate of Addition of Trub Ash to Wort on Vicinal Diketones. Worts containing 1.5 lbs ashed trub/100 bbl and 3.0 lbs ashed trub/100 bbl had slightly higher concentrations of VDK after 94 hours of fermentation. At addition rates of ashed trub beyond 3.0 lbs/100 bbl, the concentrations of VDK in wort after 94 hours fermentation decreased significantly. After 196 hours of fermentation, significant differences in VDK concentrations between the control fermentation and those containing ashed trub were observed. The control fermentation was found to contain 0.064 mg VDK/l. In comparison, the fermentations containing 1.5, 3.0, 4.5, 6.0 and 7.5 lbs ashed trub/100 bbl wort had VDK concentrations of 0.054, 0.056, 0.053, 0.048 and 0.046 mg/l.

Sensory Analysis of Pilot Brews. Finished beers from pilot-scale fermentations that had whole trub, or ashed trub added to the wort prior to pitching were compared to beer from a pilot-scale fermentation free of any supplements. Differences in aroma and taste were scored by taste test panelists using the duo-trio method of analysis. In both tests, panelists were able to distinguish the control beer from those that had whole trub or ashed trub added to the wort. The results are shown in Table 1. In addition, three panelists in each group indicated that the control beer was more sulfidic/tic than the beers whose worts contained whole trub or ashed trub.

Headspace Analyses of Pilot Fermentations. End fermented worts taken from the pilot-scale fermentations containing no additives (control), whole trub and trub ash were analyzed for organic volatile compounds by headspace gas chromatography. The results of these analyses are shown in Table 2. In general, it appears that the addition of whole trub or ashed trub to wort prior to pitching increased the concentrations of several of the higher alcohols present in the end-fermented wort. Additionally, the use of either supplement decreased the concentrations of several of the esters normally encountered in end-fermented wort. The most striking differences between the pilot-scale fermentations were the decreased concentrations of ethyl acetate and isoamyl acetate and the increased concentrations of the amyl alcohols in the fermentations containing the additives.

The results of these studies confirm that the whole trub and the other supplements containing zinc play dynamic roles in yeast metabolism during fermentation. In laboratory scale and pilot-scale fermentations, the addition of either whole trub or the other supplements containing zinc greatly enhanced fermentation rates and yielded product as good as, or better than, the fermentations lacking either supplement.

The mechanisms by which whole trub and the other supplements containing zinc exert their influences, however, are probably not identical. Whole trub contains relatively high concentrations of fatty acids, particularly linoleic acid, all of which stimulate yeast growth and lipid synthesis within the yeast cell membrane. Schisler et al. supra found that trub in wort stimulated yeast activity in a manner similar to aeration. However, unlike increased aeration, the addition of whole trub to wort increased the fusel alcohol content and reduced the levels of esters present in the finished beers. Thus, it is possible that the increased rate of fermentation observed for the fermentations containing added whole trub may have been due, primarily, to the enrichment of the wort with fatty acids. The influence on fermentation of zinc carried over in the whole trub may have been somewhat less since most of the zinc is bound with trub proteins.

The addition of the other zinc-containing supplements (i.e. Yeastex-61, zinc sulphate and ashed trub) had an immediate effect on the rate of fermentation of wort (FIG. 1). The results indicated that the fermentations containing those supplements were approximately one day ahead of the control fermentation. This rate increase was accompanied by changes in the concentrations of VDK in the worts after 73 hours and 187 hours of fermentation; fermentations containing the supplements had lower concentrations of VDK at the times of sampling. These changes in VDK concentrations probably resulted from increases in the rates of fermentation and not decreases in the overall amounts of VDK produced. By increasing the rate of fermentation, more time was available in the latter stages of fermentation for the yeast to reassimilate the VDK present in the wort.

The mechanisms by which zinc-containing supplements increase yeast vitality and rate of fermentation are not yet fully understood. It is generally thought, however, that zinc is an important component of many of the enzyme systems at work within the yeast cell. Jacobsen and Lie (4) reported that yeast grown in zinc-poor wort have reduced levels of glycogen and are unable to assimilate as much free alpha-amino nitrogen as yeast grown in zinc-enriched wort.

It also appears that the volatile components of end fermented worts vary with levels of zinc. Lie and Jacobsen (5) found that the addition of zinc to wort increased the production and subsequent concentrations of amyl alcohol and isoamyl alcohol in the end-fermented wort. These results were confirmed by headspace gas chromatographic analysis of end-fermented worts taken from the pilot-scale fermentations of wort supplemented with ashed trub (Table 2). Other fusel oils were not similarly affected. Sensory analysis of the beers produced from the pilotscale fermentations confirmed these differences (Table 1). Panelists were able to distinguish the control beer from the beers produced from worts containing added whole trub or ashed trub. In addition, panelists commented that the control beers were sulphidictic. The enhanced sulphidic/tic character of the control beers may have resulted from a real difference in the concentrations of components responsible for this aroma defect or could have been masked by the increased levels of amyl alcohols present in the two special beers. In bland beers, the latter reasoning may be of significance.

Table 3 shows the zinc contents of several brewery by-products. Among the four by-products analyzed for zinc, trub was found to contain the most—approximately 1800 ppm zinc by weight. Addition of whole trub to wort, however, has the previously described drawbacks. Wort containing a high content of whole trub can clog wort coolers, and make it difficult to filter and reclaim "clean" yeast. Additionally, beer produced from worts containing high levels of whole trub can suffer from haze problems and off-aromas caused by increased levels of fusel alcohols and lower concentrations of esters.

Table 4 shows the composition of a typical ashed trub with acceptable ranges of metallic ion content.

TABLE 1
PILOT FERMENTATIONS
Sensory Analyses of Finished Beers

| Pairs | Significant difference at:[1] | Panelist Comments |
|---|---|---|
| control vs. ashed trub | 91.6% (9 incorrect/26 total) | 3 indicated control was sulfidic |
| control vs. whole trub | 93.6% (9 incorrect/27 total) | 3 indicated control was sulfidic/DMS |

[1]Duo-trio method of analysis

TABLE 2
PILOT FERMENTATIONS
Volatile Components of End-fermented Worts

| | ppm | | |
|---|---|---|---|
| Component | Control[1] | Trub ash[2] | Whole trub[3] |
| propanol | 19.2 | 16.0 | 21.3 |
| ethyl acetate | 34.5 | 15.6 | 7.8 |
| isobutanol | 21.7 | 21.3 | 23.4 |
| ethyl propanoate | 0.2 | 0.1 | 0.1 |
| amyl alcohol | 26.3 | 28.8 | 30.5 |
| isoamyl alcohol | 64.3 | 71.5 | 82.9 |
| isobutyl alcohol | 0.1 | 0.1 | 0.1 |
| isoamyl acetate | 2.6 | 1.5 | 0.7 |
| diacetyl | 0.020 | 0.022 | 0.021 |
| 2,3-pentanedione | 0.011 | 0.009 | 0.006 |

[1]No supplements
[2]Ashed trub added to wort at a rate of 2.9 lbs/100 bbl
[3]Whole trub added to wort at a rate of 29 lbs/100 bbl TABLE 3
Zinc Content of Brewery Products

| By-Product | ppm |
|---|---|
| Whole trub | 1800 |
| Spent yeast | 24 (9) |
| Spent grain | 74 (5) |
| Spent hop leaves | 2 |

TABLE 4
Composition of Ashed Trub

| | Total | Soluble[1] |
|---|---|---|
| Ca | 82035 | 71441 |
| P | 70164 | ND[2] |
| Mg | 28302 | 29172 |
| Na | 16157 | 6680 |
| Al | 15816 | 1536 |
| Ba | 490 | 66 |
| Fe | 33259 | 2542 |
| Sr | 363 | 160 |
| B | 338 | 114 |
| Cu | 17238 | 13541 |
| Zn | 1894 | 1703 |
| Mn | 1400 | 643 |
| Cr | 200 | 8.7 |
| Cd | 4 | ND |
| Co | 6 | ND |
| Pb | 180 | ND |
| Hg | <.1 | ND |
| Ni | 129 | ND |

[1]Soluble form prepared by dissolving 5 grams ashed trub in 100 ml distilled water and adjusting the pH to 4.5 with phosphoric acid.
[2]Not done The fermentations supplemented with the ashed trub proceeded as rapidly as those supplemented with Yeastex-61 or zinc sulphate (FIG. 1) and contained less VDK at the end of fermentation as well (FIG. 2). While the effects were enhanced by increasing the rate of addition of ashed trub to wort, the differences observed were not proportional (FIGS. 3 and 4). Doubling the amount of ashed trub added to wort did not increase the rate of fermentation two-fold nor decrease the end-of-fermentation VDK concentration by a factor of two. The greatest differences in rates of fermentation and end-of-fermentation VDK concentrations occurred between the additive-free fermentation and the fermentation containing 1.5 lbs. ashed trub/100 bbl. Therefore, it appears that only a minimal amount of ashed trub is required to greatly enhance fermentation. Preferably the amount of ashed trub to be added is the amount required to maintain the zinc content of the wort at about 0.10 to about 0.50 ppm and preferably at about 0.2 ppm.

It will be apparent to those skilled in the art that the process of the present invention which comprises adding back to the fermentation yeast nutrients obtained from a normally discarded brewing product is a valuable contribution to additive-free brewing. It also will be apparent that the foregoing description has been for purposes of illustration and that a number of changes and modifications can be made without departing from the spirit and scope of the invention.

We claim:

1. In the method of brewing which includes fermenting a wort and adding an effective amount of zinc ions to the wort to enhance yeast growth, the improvement which comprises adding the zinc ions to the wort as ashed trub which has been prepared by heating trub to destroy the organic combustibles.

2. The method of preparing a zinc ion containing composition for use in brewing beer from a brewing by-product which comprises boiling wort to denature, coagulate and precipitate protein and other nitrogenous material to form trub; isolating said trub from the wort; and heating said trub to destroy any organic combustibles and to produce and based trub which contains zinc ions and is free of substances which might cause off flavors in beer.

* * * * *

UNITED STATES PATENT AND TRADEMARK OFFICE
CERTIFICATE OF CORRECTION

PATENT NO. : 4,840,802

DATED : June 20, 1989

INVENTOR(S) : Lindberg et al.

It is certified that error appears in the above-identified patent and that said Letters Patent is hereby corrected as shown below:

Column 1, line 39    After "defects" a --.-- should appear

Column 1, line 56    After worts "," should read --.--

Column 9, line 11    After "brewing" --beer-- should appear

Column 10, line 10   "and based" should read --an ashed--

Signed and Sealed this

Thirty-first Day of July, 1990

Attest:

HARRY F. MANBECK, JR.

Attesting Officer    Commissioner of Patents and Trademarks